(12) United States Patent  (10) Patent No.: US 6,519,427 B2
Kataoka  (45) Date of Patent: Feb. 11, 2003

(54) APPARATUS FOR CONTROLLING POWER SUPPLY TO AN IMAGE FIXING DEVICE

(75) Inventor: Tatsuhito Kataoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,571

(22) Filed: Nov. 20, 2001

(65) Prior Publication Data

US 2002/0061202 A1 May 23, 2002

(30) Foreign Application Priority Data

Nov. 21, 2000 (JP) ........................................ 2000-354798

(51) Int. Cl.⁷ ............................ G03G 15/20; H05B 1/02
(52) U.S. Cl. ............................ 399/69; 219/216; 399/330
(58) Field of Search ........................... 399/67, 69, 330, 399/335; 219/216

(56) References Cited

U.S. PATENT DOCUMENTS

| | | | | |
|---|---|---|---|---|
| 5,627,628 A | * | 5/1997 | Soda et al. | 399/69 X |
| 5,627,634 A | * | 5/1997 | Koh | 399/69 |
| 5,907,743 A | * | 5/1999 | Takahashi | 399/69 |
| 6,111,230 A | * | 8/2000 | Cao et al. | 399/69 X |
| 6,157,010 A | * | 12/2000 | Mine | 219/216 X |
| 6,160,975 A | * | 12/2000 | Bartley et al. | 399/69 |
| 6,301,454 B1 | * | 10/2001 | Nishida et al. | 399/69 |

FOREIGN PATENT DOCUMENTS

| | | | |
|---|---|---|---|
| JP | 11-52785 | * | 2/1999 |
| JP | 11-161086 | * | 6/1999 |
| JP | 11-305592 | * | 11/1999 |
| JP | 2000-267496 | * | 9/2000 |

* cited by examiner

Primary Examiner—Fred L. Braun
(74) Attorney, Agent, or Firm—Fitzpatrick, Cella, Harper & Scinto (57) ABSTRACT

An object of the present invention is to provide a heating apparatus that has a heat generating member a heating member heated by the heat generating member a temperature detecting member for detecting a temperature of the heating member and power supply control device for controlling power supply to the heat generating member on the basis of a detection output of the temperature detecting member, the power supply control device including a first power supply control for applying an AC voltage of a limited phase to the heat generating member and a second power supply control for applying an AC voltage of an unlimited phase to the heat generating member, wherein turning ON/OFF of power supply to the heat generating member on the basis of the detection output of the temperature detecting member is not effected during the first power supply control.

10 Claims, 10 Drawing Sheets

APPARATUS FOR CONTROLLING POWER SUPPLY TO AN IMAGE FIXING DEVICE

BACKGROUND OF THE INVENTION

1. Field of the Invention

The present invention relates to a heating apparatus suitable for use as a fixing apparatus of a copying machine, a printer, etc. using an electrostatic recording system or an electrophotographic recording system.

2. Related Art

In an image forming apparatus, such as a copying machine or a printer, a toner image is transferred to a transferring material by a photosensitive drum. Thereafter, heating/pressurizing processing is performed by a fixing heat roller to thereby effect image formation. The fixing heat roller is provided with a temperature sensor consisting of a thermistor or the like to perform temperature control. Generally speaking, a halogen heater is used as the means for heating the heat roller.

Recently, as a result of an increase in the operating speed of image forming apparatuses and the advent of color image forming apparatuses, the electric power supplied to the heating means for the heat roller has been increased in order to fix the toner on the transferring material in a stable manner through heating and pressurization.

In the above-mentioned conventional image forming apparatus, there is a further demand for an increase in speed, and to meet this demand, there is a necessity to substantially increase the electric power supply to the halogen heater used as the means for heating the heat roller.

Because of its characteristics, the halogen heater involves a large rush current flow at the time of power supply, and, as is pointed out, this can affect the commercial power source by causing a temporary reduction in voltage. In particular, in a halogen heater to which large power is supplied, the commercial power source is affected to a considerable degree.

Conventionally, to cope with a load with large rush current, phase control or the like to achieve a reduction in current supply angle in TRIAC, thyristor, SSR (solid state relay), etc. for controlling current supply to the halogen heater, is performed for a period of ten and several cycles of the commercial power frequency which is under the influence of the rush current.

However, when such phase control is executed, the TRIAC, thyristor, SSR or the like involves generation of a great radio noise at the time of switching.

SUMMARY OF THE INVENTION

It is an object of the present invention to provide a heating apparatus in which rush current is suppressed.

Another object of the present invention is to provide a heating apparatus which involves no noise generation even if AC current phase is controlled.

Still another object of the present invention is to provide a heating apparatus comprising:

a heat generating member;

a heating member heated by the heat generating member;

a temperature detecting member for detecting the temperature of the heating member; and power supply control means for controlling power supply to the heat generating member on the basis of a detection output of the temperature detecting member, the power supply control means including a first power supply control for applying an AC voltage of a limited phase to the heat generating member and a second power supply control for applying an AC voltage of an unlimited phase to the heat generating member, wherein turning ON/OFF of power supply to the heat generating member on the basis of a detection output of the temperature detecting member is not effected during the first power supply control.

The other objects of the present invention become apparent from the following description.

DESCRIPTION OF THE PREFERRED EMBODIMENTS

An embodiment of the present invention will now be described with reference to the drawings.

Figure 1:
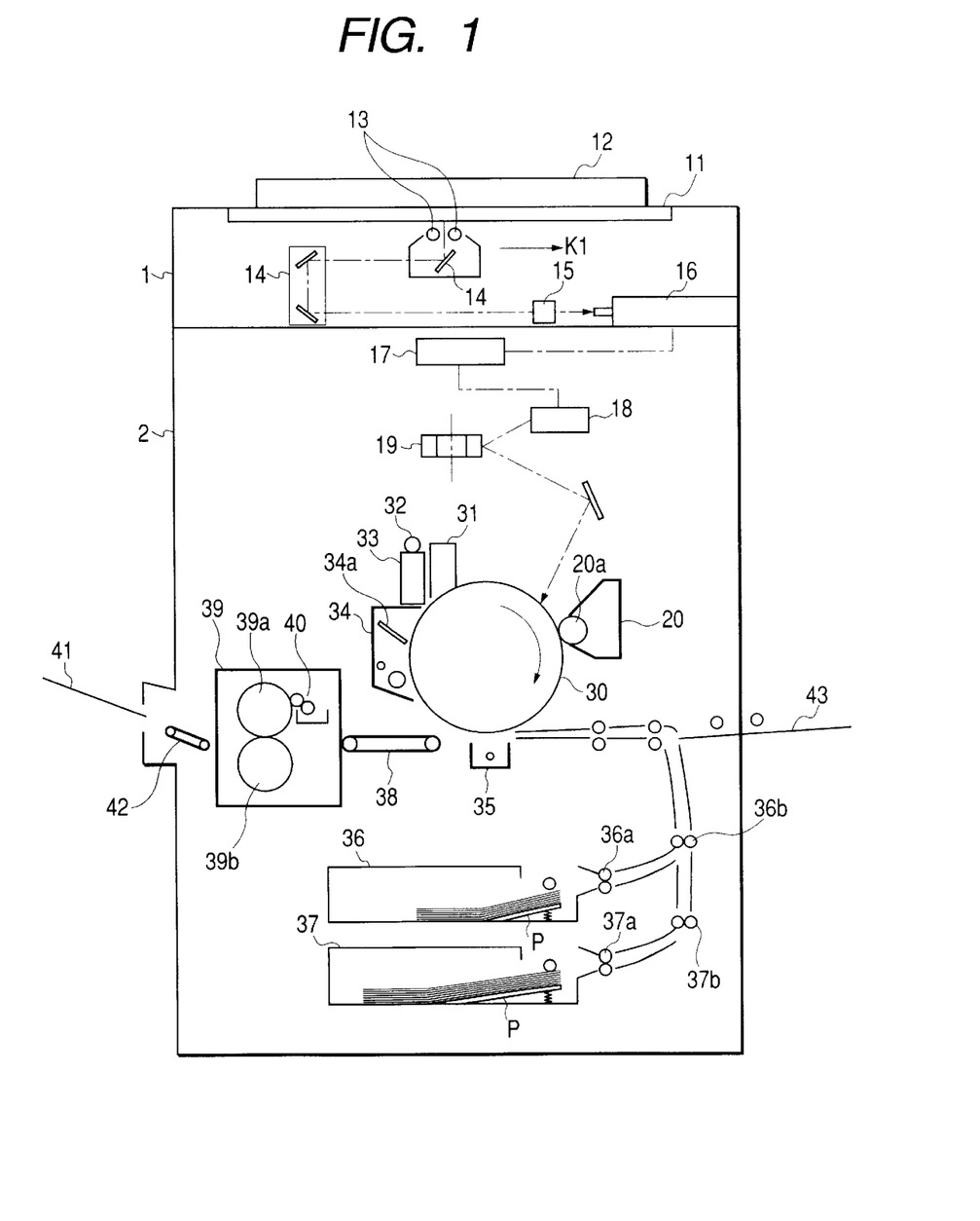
FIG. 1 is a sectional view showing an image forming apparatus according to an embodiment of the present invention.

FIG. 1 is a sectional view showing an image forming apparatus according to an embodiment of the present invention. The image forming apparatus of the present invention is a digital copying apparatus using tn electrophotographic system.

This image forming apparatus has a reader portion 1 in the upper portion of the apparatus main body, and a printer portion 2 in the lower portion of the same.

The reader portion 1 mainly comprises: an original tray 11 on which an original is placed; an original pressurizing plate for pressurizing the placed original from above; a light source 13 for illuminating the image surface of the original; a plurality of mirrors 14 and a lens 15 for guiding reflected light from the image surface; and an image processing portion 16 for performing photoelectric conversion on the reflected light by an image pickup device (hereinafter referred to as "CCD") and executing various image processing operations in response to electric signals obtained. The image processing portion 16 is capable of performing image processing operations, such as photoelectric conversion, A/D conversion, S/H, shading compensation, masking compensation, scaling, and LOG conversion.

The reader portion 1, constructed as described above, operates as follows.

The original is placed on the original tray 11 with its image surface directed downward, and is pressed down from above by the original pressurizing plate 12. The light source 13 moves in the direction indicated by the arrow K1 while irradiating the image surface with light to thereby scan the image surface of the original. The reflected light image from the image surface is transmitted through the plurality of mirrors 14 and the lens 15 to form an image on the CCD on the image processing portion 16, where the image undergoes photoelectric conversion to become an electric signal. The image signal converted into an electric signal undergoes various image processing operations in the image processing portion 16 before it is sent to the printer portion 2.

As shown in FIG. 1, the printer portion 2 mainly comprises an image control portion 17 for converting the electric signal transmitted from the reader portion 1 into a signal for driving a laser, a laser device 18, a polygon scanner 19 for scanning the surface of a photosensitive drum described below with a laser beam, an image forming portion including the photosensitive drum described below, and a fixing unit 39 arranged at the downstream end.

The above-mentioned image forming portion comprises a photosensitive drum 30 supported so as to be rotatable in the direction indicated by the arrow, and the following components successively arranged around the photosensitive drum substantially along the rotating direction thereof: a primary charger 31 for uniformly charging the surface of the photosensitive drum 30, a developing device 20 for developing a latent image on the photosensitive drum 30, a transfer charger 35 for transferring a toner image on the photosensitive drum 30 to a transferring material P, a cleaner 34 for removing residual toner on the photosensitive drum 30, a cleaner blade 34a, an auxiliary charger 33 for charge removal, and a pre-exposure lamp 32 for removing residual charge.

Further, the developing device 20 is provided with a developing roller 20a. The developing roller 20a and the photosensitive drum 30 rotate in opposite directions to each other, whereby a toner image is developed on the photosensitive drum 30. In fixing unit 39, an oil application unit 40 is provided.

The transferring material P, to which a toner image has been thus transferred, is conveyed to the fixing unit 39 by a pre-fixing belt 38. In the fixing unit 39, fixing rollers 39a and 39b rotate to convey the transferring sheet P while pressurizing it, the toner image being fixed to the transferring material P through heating and pressurization. Finally, the transferring material P which has undergone fixing operation is discharged onto a sheet discharging tray 41 outside the apparatus main body by a post-fixing conveyance belt 42.

A feeding/conveyance portion for feeding/conveying the transferring material P has a conveyance path for the transferring material P, and there is provided at the upstream end with respect to the transferring sheet conveying direction a sheet feeding apparatus having a sheet feeding cassette 36, sheet feeding rollers 36a, conveying rollers 36b, etc.

Apart from this sheet feeding apparatus, there is provided a multi sheet feeding apparatus 43. This multi sheet feeding apparatus 43 has a straight sheet feeding path, so that it is capable of supplying the image forming portion with various transferring materials P of different materials, sizes, etc.

Figure 2:
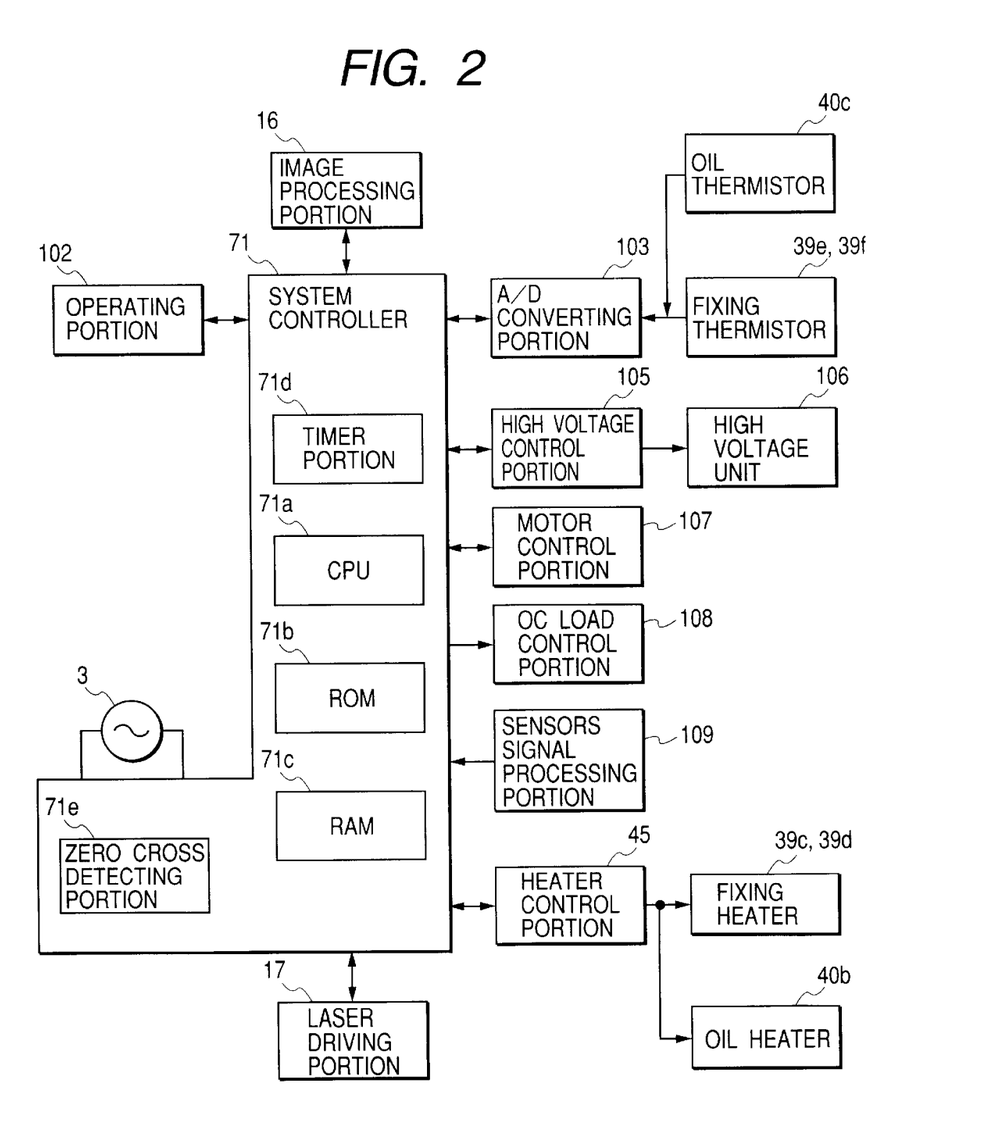
FIG. 2 is a block diagram showing the structure of the control system of an image forming apparatus.

FIG. 2 is a block diagram showing the structure of the control system of this image forming apparatus.

A system controller 71 has control over the entire image forming apparatus. The system controller 71 mainly serves to drive each load in the apparatus and to collect and analyze information from sensors. Further, the system controller 71 performs data exchange with the image processing portion 16 and the laser driving portion 17 and with an operating portion 102, which is a user interface. A CPU 71a, a ROM 71b, and a RAM 71c for the above operations are mounted in the system controller 71. The CPU 71a executes various sequences, such as a predetermined image formation sequence, according to a program stored in the ROM 71b. The data generated in the process is temporarily stored in the RAM 71c. The RAM 71c stores, for example, a high voltage set value for a high voltage control portion 105 described below, various items of data described below, image formation command information from the operating portion 102, etc.

Next, the first function of the system controller 71, i.e., the data exchange with the image processing portion 16, the laser driving portion 17, and the operating portion 102, will be described.

As stated above, the image processing portion 16 performs image processing operations, such as A/D conversion, S/H, shading compensation, masking compensation, scaling, LOG conversion, etc. on an image signal output from the CCD. The system controller 71 transmits the requisite specified set-value data for these image processing operations to each portion of the data processing portion 16. Further, it receives a signal, such as an original image density signal, from each portion of the image processing portion 16, and controls the high voltage control portion 105 and the laser driving portion 17 described below to effect setting for realizing optimum image formation. The laser driving portion 17 controls the laser in an optimum manner based on the prescribed size of the image to be formed and digital video data that has undergone image processing. The system controller 71 performs the requisite setting for PWM processing laser emission on the laser driving portion 17. The operating portion 102 transmits information, such as the scaling and the density set value set by the user, to the system controller 71, and receives from the system controller 71 information on the condition of the image forming apparatus, such as the number of images to be formed and whether image formation is being performed or not, and data for indicating to the user occurrence of jamming, the position where jamming has occurred, etc.

Next, the second function of the system controller 71, i.e., the driving of each load inside the apparatus and collection and analysis of information from the sensors, will be described.

Inside the image forming apparatus, there are arranged motors, DC loads, such as clutch/solenoid, and sensors, such as photo interrupters and micro switches. By appropriately driving the motors and DC loads, the transferring material is conveyed and each unit is driven, the sensors monitoring the operations. The system controller 71 causes a motor control portion 107 to control each motor on the basis of signals from a sensors signal processing portion 109 for performing signal processing on detection signals transmitted from the various sensors, and causes a DC load control portion 108 to control the DC loads, such as clutch/solenoid, to thereby smoothly proceed with image forming operation.

The system controller 71 transmits various high voltage control signals to the high voltage control portion 105 to thereby cause an appropriate high voltage to be applied to the primary charger 31, the auxiliary charger 33, the transfer charger 35, and the developing roller 20a, which constitute a high voltage unit 106.

Further, the fixing rollers 39a and 39b in the above-mentioned fixing unit 39 respectively contain fixing heaters 39c and 39d for heating the rollers, and the oil application unit 40 contains an oil heater 40b for heating the oil applied to the fixing rollers 39a and 39b, the heaters 39c, 39d, and 40b being ON/OFF controlled by a heater control portion 45.

The fixing rollers 39a and 39b are respectively provided with fixing thermistors 39e and 39f for measuring their temperatures, and the oil heater 40b is provided with an oil thermistor 40c for measuring the temperature thereof. Changes in the resistance values of the thermistors 39e, 39f, and 40c in accordance with changes in the temperatures of the fixing rollers 39a and 39b and the oil heater 40b are converted into voltage values, and then converted into digital values by an A/D converting portion 103 before being input to the system controller 71. On the basis of the temperature data, the system controller 71 controls the heater control portion 45.

The system controller 71 is provided with a zero cross detecting portion 71e for detecting zero cross of the voltage of a commercial power source 3, and the zero cross detecting portion 71e generates a trigger signal for controlling the power supplied to the fixing heaters 39c and 39d.

Figure 3:
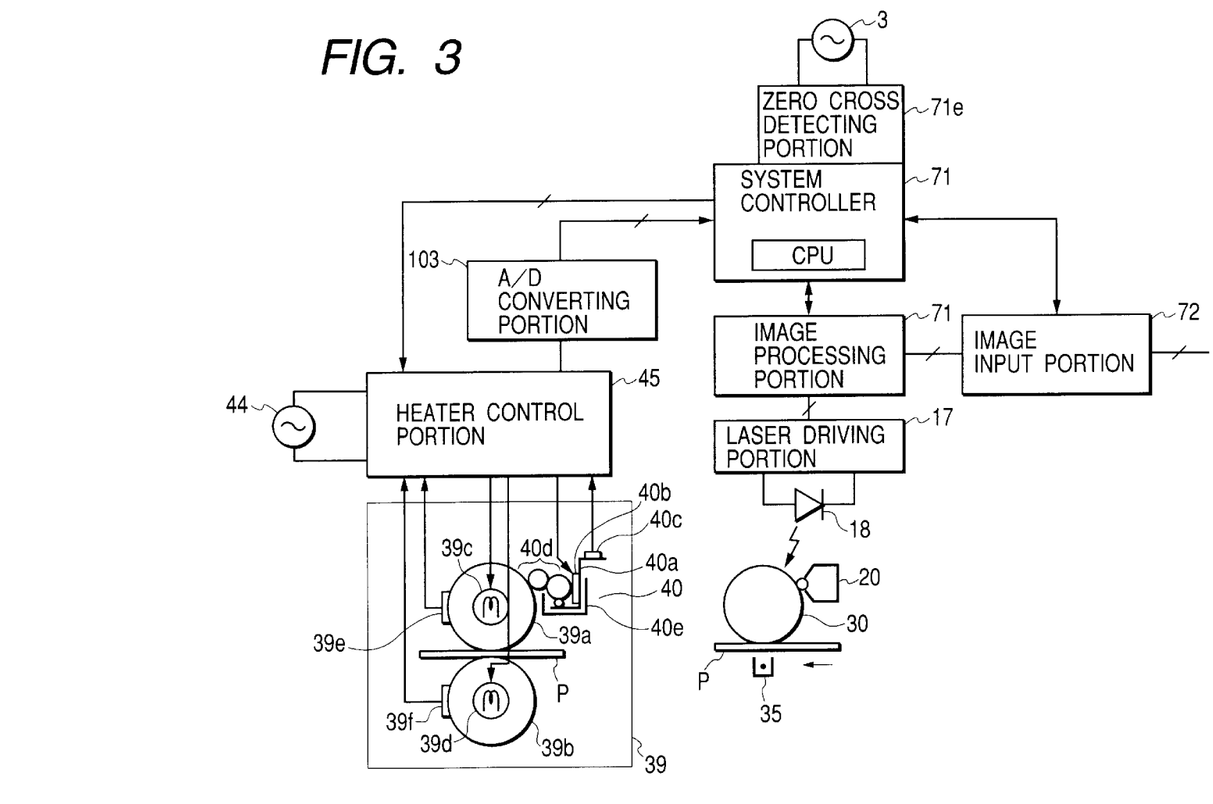
FIG. 3 is a block diagram showing the structure of the portions of an image forming apparatus where image formation and image fixing with respect to a transferring material are effected.

FIG. 3 is a block diagram showing the structure of the portion of the above-mentioned image forming apparatus concerning the formation of an image and the fixing of the same to the transferring material P.

The system controller 71 performs various control operations for the image forming apparatus, centralized control being executed by the CPU provided inside. In FIG. 3, numeral 72 indicates an image input portion constituting a part of the reader portion 1, numeral 16 indicates an image processing portion, numeral 17 indicates a laser driving portion for modulating and driving a semiconductor laser on the basis of image data, and numeral 18 indicates a semiconductor laser (laser device) driven by the laser driving portion 17.

Numeral 30 indicates the photosensitive drum on which an electrostatic latent image is formed by the output light of the semiconductor laser 18, numeral 20 indicates the developing device for performing development in accordance with the latent image on the photosensitive drum 30, and numeral 35 indicates the transfer charger for transferring the toner image on the photosensitive drum 30 onto the transferring material P.

Numeral 39 indicates the fixing unit for fixing the toner image on the transferring material P through heating and pressurization.

Next, the fixing unit 39 in the above-mentioned image forming apparatus will be described with reference to FIG. 3.

The fixing rollers 39a and 39b respectively contain the fixing heaters 39c and 39d for heating these rollers. As stated above, the heaters are ON/OFF controlled by the system controller 71 through the heater control portion 45. The fixing heaters 39c and 39d consist of halogen heaters. The ON/OFF control of the heaters is effected so as to attain a prescribed temperature on the basis of the temperatures as obtained through measurement by the temperature monitoring fixing thermistors 39e and 39f mounted so as to be in contact with the rollers.

Further, in the fixing unit 39, the application of silicone oil for improving the releasability between the upper fixing roller 39a and the transfer material P is conducted by the oil application unit 40. The oil application unit 40 comprises an oil pan 40e for storing oil, an oil temperature adjusting oil heater 40b for maintaining the viscosity of the oil at a fixed level, a heater mounting metal sheet 40a for transmitting the heat of the oil heater 40b to the silicone oil, an oil thermistor 40c for measuring the temperature of the oil heater 40b, and oil application rollers 40d for applying an appropriate amount of oil to the upper fixing roller 39a. As in the case of the temperature control of the fixing rollers 39a and 39b, the oil heater 40b is ON/OFF controlled by the system controller 71 through the heater control portion 45. The ON/OFF control of the oil heater 40b is conducted so as to attain a prescribed temperature on the basis of the temperature as obtained through measurement by the temperature monitoring oil thermistor 40c mounted to the oil heater 40b.

Connected to the heater control portion 45 is a primary power source 44 for supplying primary power to the heaters 39c, 39d, and 40b, and the ON/OFF control of the power supply is executed by an SSR (solid state relay) inside the heater control portion 45. Signals from the thermistors 39e, 39f, and 40c are directly input to the system controller 71 through the heater control portion 45. At the same time, abnormality detection for the thermistors 39e, 39f, and 40c is conducted inside the heater control portion 45 to detect thermistor breakage, abnormal temperature detection, etc., outputting a signal indicating the abnormality to the system controller 71.

Figure 4:
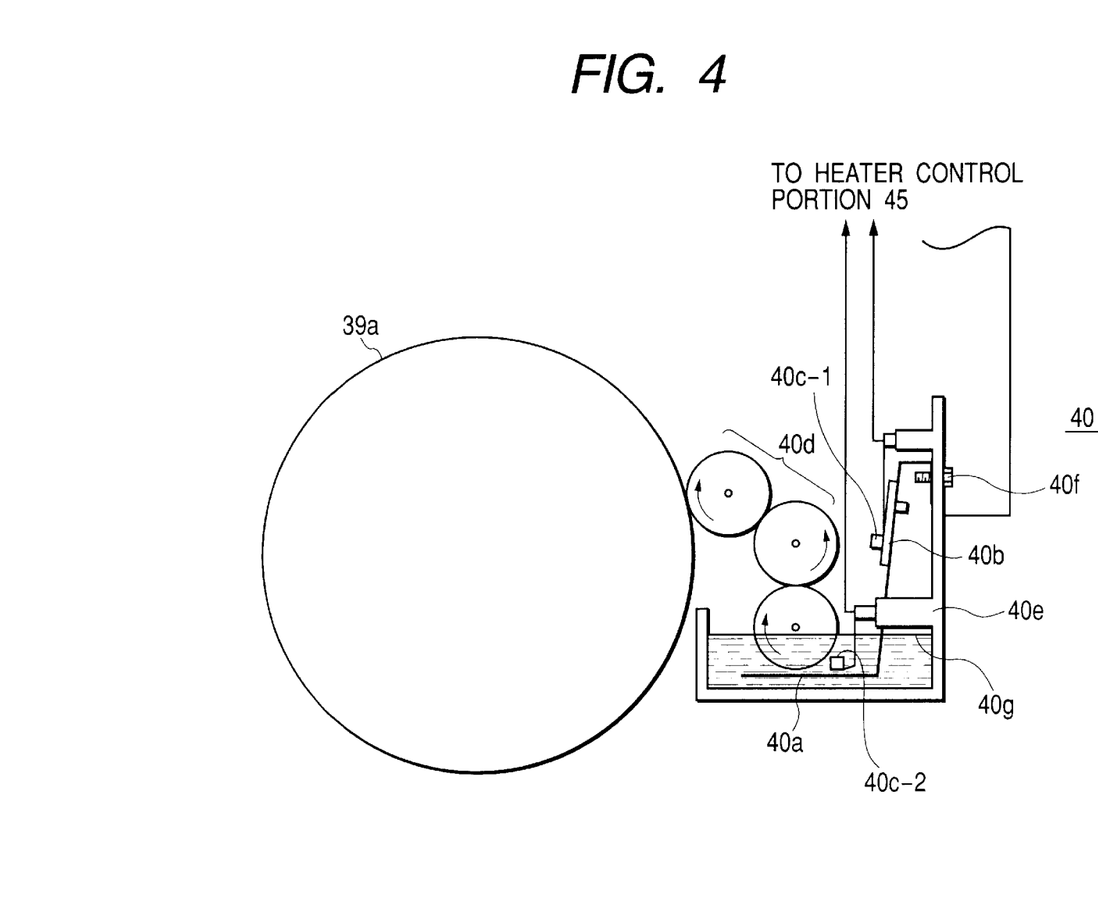
FIG. 4 is a sectional view showing the structure of an oil application unit in a fixing unit.

FIG. 4 is a sectional view showing the structure of the oil application unit 40 inside the fixing unit 39.

As stated above, the oil application unit 40 comprises the heater mounting metal sheet 40a, the oil heater 40b, the oil application rollers 40d, the oil pan 40e, and two oil temperature monitoring thermistors 40c-1 and 40c-2. The oil pan 40e is filled with silicone oil to the level indicated by a solid line 40g. The oil application rollers 40d rotate in the direction indicated by the arrows, whereby an appropriate amount of oil is applied to the upper fixing roller 39a. The lower portion of the heater mounting metal sheet 40a is immersed in the silicone oil, and the oil heater 40b is mounted to the portion of the heater mounting metal sheet 40a which is not immersed in the silicone oil. Due to this arrangement, there is no need to use an expensive oil proof heater, and the silicone oil can be heated by a relatively inexpensive heater, the heating of the silicone oil being effected indirectly through the heater mounting metal sheet 40a. As the means for detecting the temperature of the silicone oil, the thermistor 40c-2 is used, which is immersed into the silicone oil to directly detect the temperature of the silicone oil. Further, the thermistor 40c-1, which detects the temperature of the oil heater 40b, is used.

Figure 5:
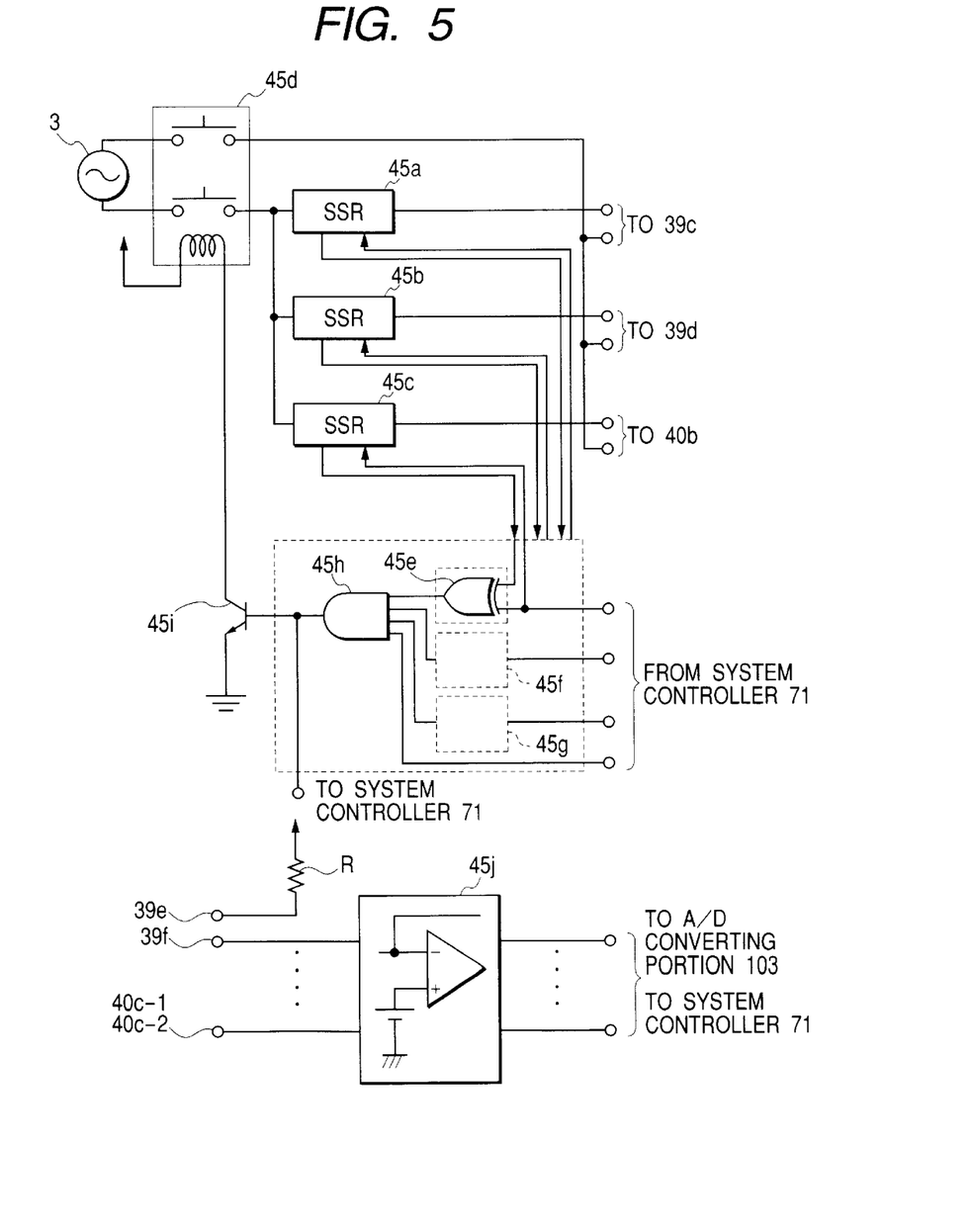
FIG. 5 is a circuit diagram showing the inner structure of a heater control portion.

FIG. 5 is a circuit diagram showing the inner structure of the heater control portion 45.

As stated above, the heater control portion 45 serves to perform ON/OFF control of the heaters 39c, 39d, and 40b, and the ON/OFF control of the primary power supplied to the heaters is executed by SSRs (solid state relays) 45a, 45b, and 45c. Signals for controlling the SSRs 45a, 45b, and 45c are supplied from the system controller 71. Further, condition signals are respectively output from the SSRs 45a, 45b, and 45c to SSR abnormality detection circuits 45g, 45f, and 45e, which consist of Ex. NOR logic circuits. The condition signals show whether these SSRs actually conduct the primary power or not. In the case of conduction, a high-level signal "H" is output, and, in the case of non-conduction, a low-level signal "L" is output. In the SSR abnormality detection circuits 45e, 45f, and 45g, the conditions signals from the SSRs 45c, 45b, and 45a are respectively compared with the ON/OFF control signals (which are "H" in the case of ON, and "L" in the case of OFF). When there is a disparity between the ON/OFF control signal from the system controller 71 and the condition signal, i.e., when, for example, an OFF signal ("L") is output from the system controller while the conducting condition of the corresponding SSR is ("H"), an abnormality detection signal of "L" is output to an AND circuit 45h. When the ON/OFF control signal and the condition signal agree with each other, an "H" signal is output to the AND circuit 45h.

Only when "H" signals are input thereto from all of the SSR abnormality detection circuits 45e, 45f, and 45g, the AND circuit 45h outputs an "H" signal to a transistor 45i (Signal input to the AND circuit 45h from the system controller 71 will be described below). That is, if there is a problem in any one of the SSRs 45a, 45b, and 45c, an "L" signal is output to the transistor 45i. A relay 45d is provided between the commercial power source 3 and the SSRs 45a, 45b, and 45c. The transistor 45i is turned OFF when an "L" signal is input thereto. In that case, the relay 45d is turned OFF, and the power supply to the SSRs 45a, 45b, and 45c from the commercial power source 3 is stopped. Thus, if there is a problem in any one of the SSRs 45a, 45b, and 45c, the power supply from the commercial power source 3 to the SSRs 45a, 45b, and 45c is stopped. Normally, an "H" signal is supplied to the AND circuit 45h from the system controller 71. When it is necessary to forcibly stop the power supply from the commercial power source 3 to the SSRs 45a, 45b, and 45c, an "L" signal is supplied to the AND circuit 45h from the system controller 71, and the power supply is stopped regardless of whether there is abnormality in the SSRs 45a, 45b, and 45c.

The thermistors 39e, 39f, 40c-1, and 40c-2 are pulled up by the power source through a resistor R in order to detect variation in resistance value with respect to temperature as variation in voltage. The detection voltage values from the thermistors 39e, 39f, 40c-1, and 40c-2 are compared with corresponding set voltage values in an abnormal temperature detecting circuit 45j, and a judgment is made as to whether there is any abnormality in the corresponding thermistors. The detection voltage values are then transmitted to an A/D converting portion 103 along with the judgment result, and are processed by the system controller 71. When the temperature detected by a thermistor is a temperature not lower than a prescribed temperature (a temperature greatly deviated from an adjustment temperature), the abnormal temperature detecting circuit 45j decides that there is some abnormality in the thermistors, and informs the system controller 71 thereof.

Next, zero cross detection for the commercial power source 3 will be described with reference to FIG. 6.

Figure 6:
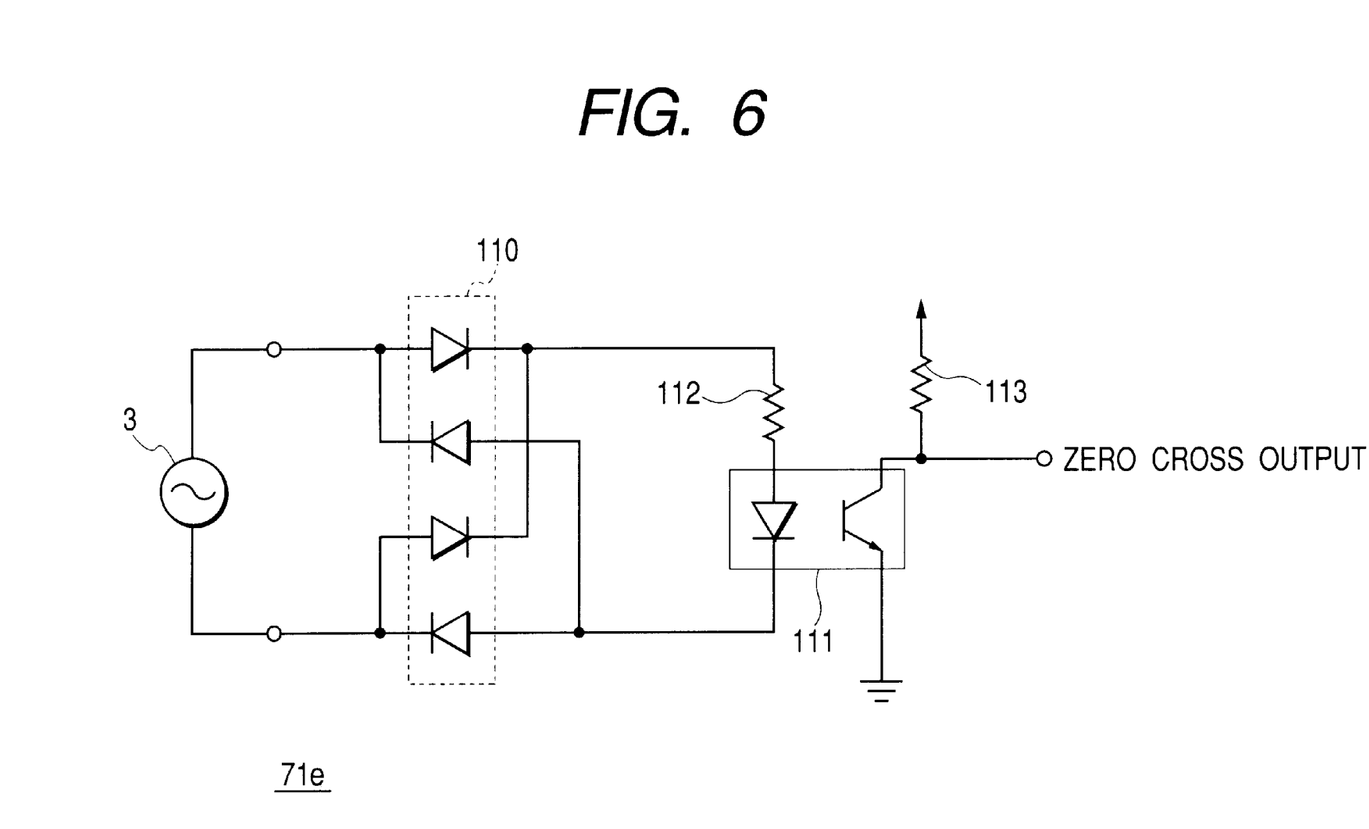
FIG. 6 is a circuit diagram showing the inner structure of a zero cross detecting portion.

FIG. 6 is a circuit diagram showing the inner structure of a zero cross detecting portion 71e.

The current from the commercial power source 3 undergoes full-wave rectification by a diode bridge 110, and is applied to a photo coupler 111 through a resistor 112. On the LED side of the photo coupler 111, pulsating current from the commercial power source 3 which has undergone full-wave rectification flows, whereby the LED emits light. That is, when the instantaneous voltage of the commercial power source 3 is near 0 V (near zero cross), there is scarcely any light emission from the LED. On the transistor side of the photo coupler 111, the collector is pulled up at 5 V through a resistor 113, so that, when the voltage of the commercial power source 3 is near zero cross, the transistor outputs a high level signal "H"; otherwise, it outputs a low level signal "L". A signal indicating the timing of this zero cross (a zero cross signal) is supplied to a CPU 71a in the system controller 71.

Next, a zero cross control will be described with reference to FIGS. 7A through 7E.

FIGS. 7A through 7E are diagrams illustrating driving signals for the SSRs 45a and 45b for supplying power to the fixing heaters 39c and 39d.

Figure 7A:
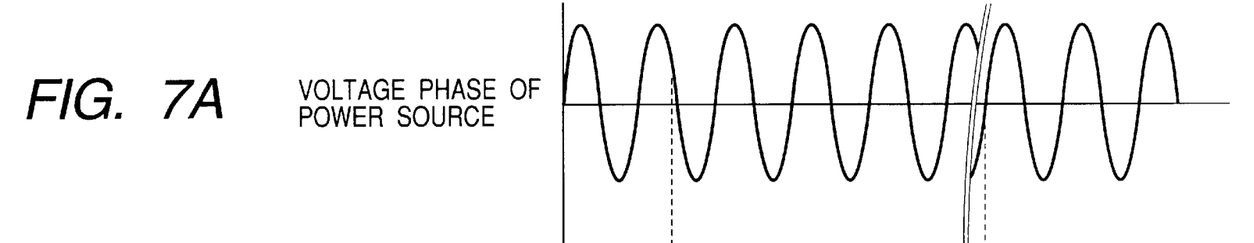
FIGS. 7A, 7B, 7C, 7D and 7E are diagrams illustrating driving signals of an SSR for supplying power to a fixing heater.
Figure 7B:
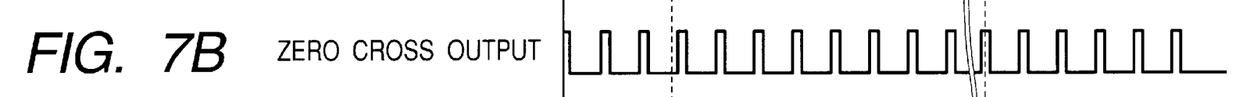
Figures 7C, 7D:
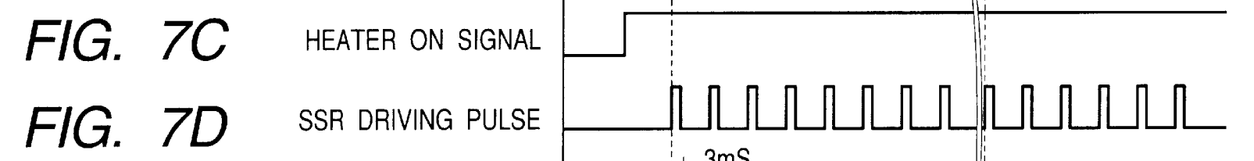

FIG. 7A shows the voltage waveform of the commercial power source 3. As stated above, a zero cross signal of the commercial power source 3 is detected by the zero cross detecting portion 71e. FIG. 7B shows the zero cross signal detected. FIG. 7C shows a heater ON signal, which is at high level "H" while the fixing heaters 39c and 39d are being driven.

In this image forming apparatus, halogen heaters are used as the fixing heaters 39c and 39d. A halogen heater involves a large rush current at its starting. When a large rush current flows, the SSRs 45a and 45b for driving the fixing heaters 39c and 39d deteriorate. At the same time, a temporary reduction in voltage occurs on the commercial power source 3 side, which may affect not only the image forming apparatus, but also other apparatuses connected to the commercial power source 3. In view of this, in this image forming apparatus, normal electricity supply is not effected for a period of 300 ms, which corresponds to ten and several cycles in the commercial power source 3, and phase control is executed so as to reduce the current supply angle for the SSRs to effect pre-heating of the halogen heaters. In this phase control, the CPU 71a in the system controller 71 generates an SSR driving pulse as shown in FIG. 7D based on the zero cross signal shown in FIG. 7B. The SSR driving pulse is a gate trigger signal which is to be input to a TRIAC in the SSR. When the zero cross signal as shown in FIG. 7B is detected immediately after the heater ON signal as shown in FIG. 7E has become "H", the CPU 71a generates an SSR driving pulse which has a pulse width of 3 ms and which falls at zero cross.

Figure 7E:
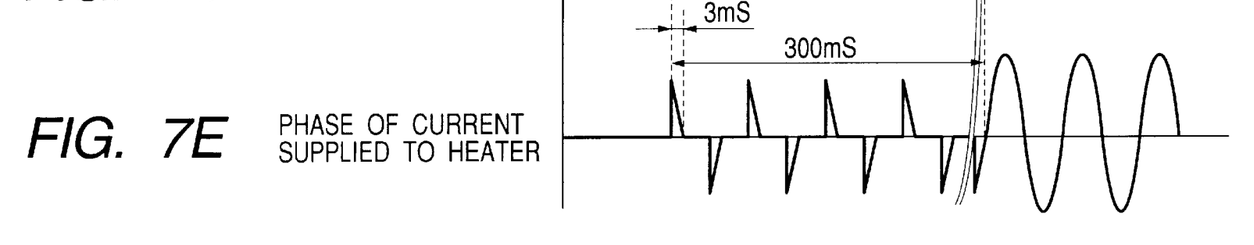

When this SSR driving pulse is input to the SSR, a current as shown in FIG. 7E which has a current supply time of 3 ms flows through the SSR, whereby pre-heating is executed in the corresponding fixing heater. After 300 ms since the starting of the SSR driving pulse generation, the current supply time is restored to 100%.

As described above, phase control is executed independently on the fixing halogen heaters 39c and 39d at the initial stage of current supply, whereby the rush current is suppressed to a minimum.

When current supply phase control is performed on the currents supplied to the fixing heaters 39c and 39d, a radio noise in correspondence with the magnitude of the current supply time is generated by the switching at the SSRs 45a and 45b. Generally speaking, the noise terminal voltage is maximum where the phase of the current supply time is near 90 degrees. Even where the current supply time is small, the noise terminal voltage becomes high as the power consumption of the fixing heaters increases. When the phase control period becomes longer, the noise terminal voltage generation time naturally becomes so much the longer.

Normally, the noise terminal voltage is suppressed by using a noise filter or the like. When its value is large, there is nothing for it but to adopt a noise filter with a very large time constant. However, there is little possibility of such a noise filter with an extremely large time constant being realized. In addition, it is very difficult to completely eliminate the generation of radio noise.

In view of this, in the image forming apparatus of the present invention, the frequent repetition of turning ON/OFF of power supply (chattering), generated near the adjustment temperature of the fixing heaters 39c and 39d, is prevented as much as possible, and the generation of noise terminal voltage is suppressed to a minimum. That is, each time the temperatures of the fixing heaters 39c and 39d become lower than the prescribed temperature and power supply is started, the above-mentioned current supply phase control of the supply current is started, and radio noise is generated while the phase control is being conducted. Thus, when there is a frequent repetition of turning ON/OFF of power supply, noise is generated almost continuously, which means prevention of frequent repetition of turning ON/OFF of power supply leads to a reduction in the noise generation period.

In the following, an current supply control algorithm for the fixing heaters 39c and 39d will be specifically described with reference to FIGS. 8A through 8D. While the fixing heaters 39c and 39d (fixing rollers 39a and 39b) are controlled independently, they are controlled by the same current supply control algorithm, so that in the following description, no distinction will be made between the fixing heaters.

FIGS. 8A through 8D are diagrams showing the relationship between the change in the temperature T of the fixing roller and the heater driving signal.

Figures 8A, 8B:
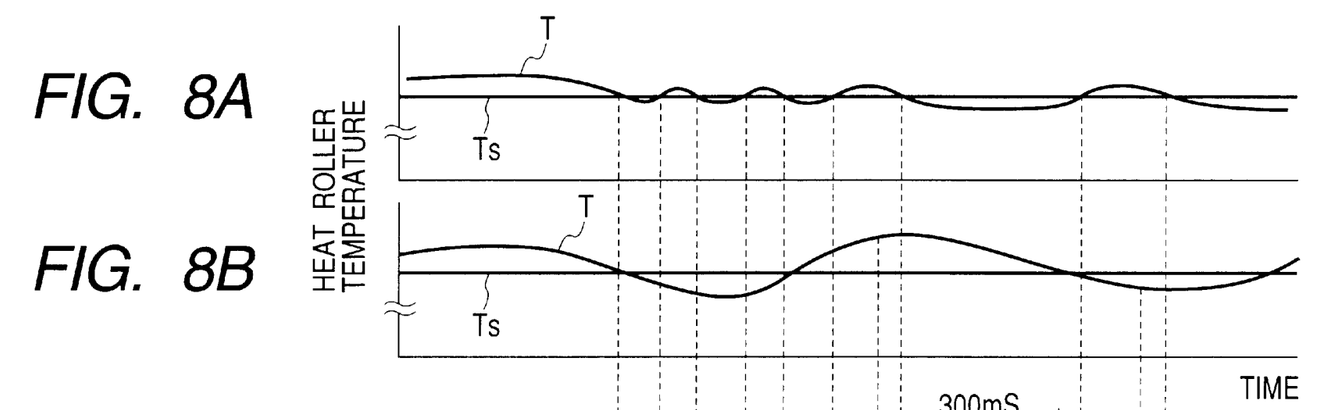
FIGS. 8A, 8B, 8C and 8D are diagrams showing the relationship between variation in fixing roller temperature T and heater driving signal.
Figures 8C, 8D:
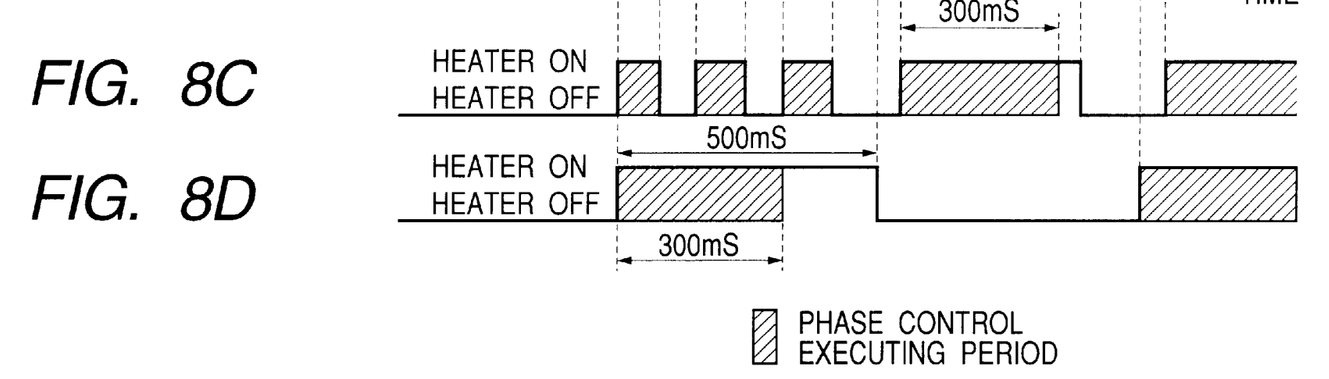

FIG. 8A shows variation in the fixing roller temperature in a conventional control method, and FIG. 8B shows variation in the fixing roller temperature in the control method of the present invention. FIG. 8C shows the heater driving signal in the conventional control method, and FIG. 8D shows the heater driving signal in the control method of the present invention.

In the drawings, symbol Ts indicates a threshold temperature value for turning ON/OFF the power supply to the fixing heater. When the fixing roller temperature T is higher than the threshold temperature value Ts, the power supply to the fixing heater is stopped (OFF). When the former is lower than the latter, the power supply is started (ON). The shaded portions in FIGS. 8C and 8D indicate the periods during which phase control is executed.

Generally speaking, when temperature control is performed in order to maintain the fixing roller at the target temperature, the smaller the heat capacity of the fixing roller, and the larger the power of the fixing heater, the greater the possibility of chattering being generated near the target temperature. In particular, with the increase in the speed of image heating apparatuses, there is a tendency for the fixing heater power to increase, and chattering is likely to be generated. That is, when suppressing the rush current by performing phase control for 300 ms after the start (ON) of power supply to the fixing heater, if, as shown in FIG. 8A, the temperature T of the fixing roller varies rapidly (high temperature responsiveness), the start (ON) of power supply to the fixing heater occurs frequently as shown in FIG. 8C, phase control being performed each time power supply is started. As stated above, while phase control is being performed, radio noise is generated.

In view of this, in the present invention, the heat capacity of the fixing roller is increased (If possible, the power of the fixing heater may be reduced) so that, as shown in FIG. 8B, the temperature T of the fixing roller does not rapidly changes (low temperature responsiveness). Further, the interval of the fixing roller temperature detection is set to be longer than the period of 300 ms, during which phase control is executed. For example, as shown in FIG. 8D, the interval of the fixing roller temperature detection is set to be 500 ms.

As shown in FIG. 8D, due to this arrangement, phase control is not executed for at least 200 ms after the execution of phase control for 300 ms. Further, when the fixing roller temperature T is higher than the threshold temperature Ts after 500 ms has elapsed (which is likely to be the case), no phase control is executed until another 500 ms has elapsed. Thus, the period of time during which phase control is executed is reduced as compared with the prior art, thereby reducing the period during which radio noise is generated.

Figure 9:
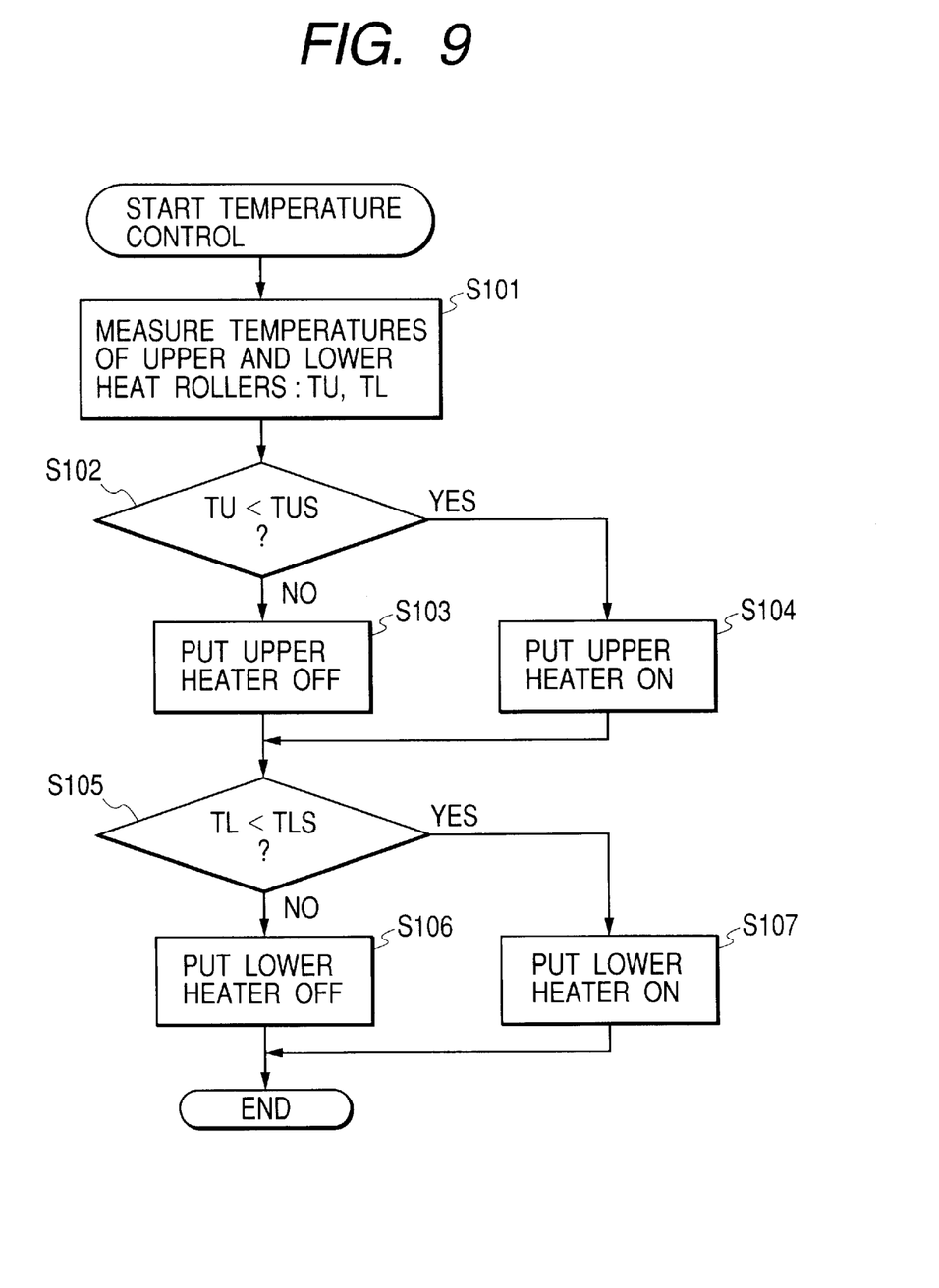
FIG. 9 is a flowchart showing the procedures for supplying electricity to the fixing heaters of upper and lower fixing rollers executed by a system controller.

FIG. 9 is a flowchart showing the procedures of power supply to the fixing heaters 39c and 39d of the upper and lower fixing rollers 39a and 39b. The processing is executed regularly at an interval of 500 ms.

When temperature control is started, the respective temperatures of the upper and lower fixing rollers 39a and 39b are measured by the fixing thermistors 39e and 39f (step S101). The measurement values thus obtained will be referred to as TU and TL. Next, a judgment is made as to whether the temperature TU of the upper fixing roller 39a is lower than the threshold temperature value TUS of the upper fixing roller 39a (step S102). When the temperature TU is not lower than the threshold temperature value TUS, the power supply to the upper fixing heater 39c is stopped (OFF) (step S103). When the temperature TU is lower than the threshold temperature value TUS, power is supplied (ON) to the upper fixing heater 39c (step S104).

Subsequently, a judgment is made as to whether the temperature TL of the lower fixing roller 39b is lower than the threshold temperature value TLS of the lower fixing roller 39b (step S105). When the temperature TL is not lower than the threshold temperature value TLS, the power supply to the lower fixing heater 39d is stopped (OFF)(step S106). When the temperature TL is lower than the threshold temperature value TLS, power is supplied to the lower fixing heater 39d (ON) (step S107).

In the above-mentioned embodiment, the interval of the fixing roller temperature detection is set to be longer than the period of 300 ms, during which phase control is executed, in order to reduce the period during which radio noise is reduced. Instead, it is also possible to provide the target temperature of the fixing roller with a dead zone, that is, a temperature hysteresis width, making the ON/OFF interval of the fixing heater with respect to the temperature change in the fixing roller larger than the phase control interval. This arrangement will be described with reference to FIGS. 10A through 10D. In this embodiment also, the fixing heaters 39c and 39d (fixing rollers 39a and 39b) are controlled independently, and the same power supply control algorithm is used for both of them. Thus, in the following description, no distinction will be made between the two fixing heaters.

FIGS. 10A through 10D are diagrams showing the relationship between the change in the temperature T of the fixing roller and the heater driving signal in the other embodiment.

Figure 10A:
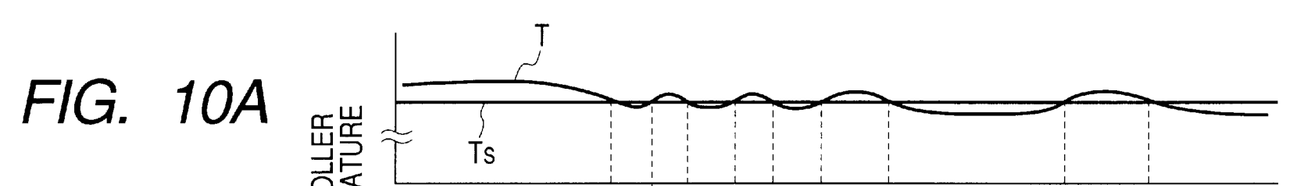
FIGS. 10A, 10B, 10C and 10D are diagrams showing the relationship between variation in fixing roller temperature T and heater driving signal in another embodiment.
Figure 10B:
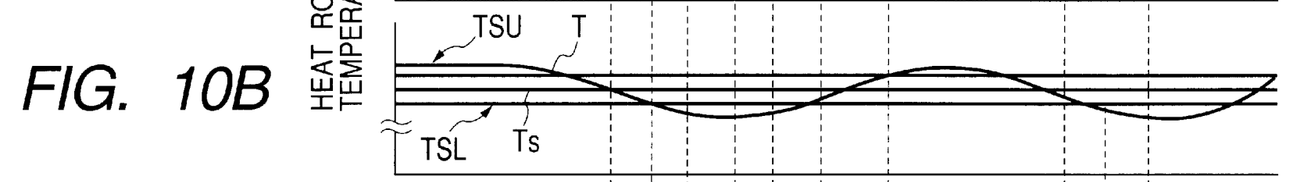
Figure 10C:
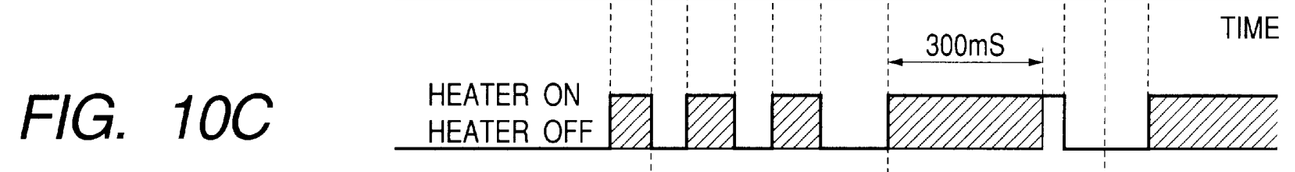

FIG. 10A shows changes in the fixing roller temperature in a conventional control method, and FIG. 10B shows changes in the fixing roller temperature in the control method of the other embodiment. FIG. 10C shows the heater driving signal in the conventional control method, and FIG. 10D shows the heater driving signal in the control method of the other embodiment.

In the drawings, symbol T indicates the temperature of the fixing roller, symbol TS indicates the target temperature, symbol TSU indicates the upper limit value of the target temperature, and symbol TSL indicates the lower limit value of the target temperature. The area between the upper limit value TSU and the lower limit value TSL is a dead zone. That is, when the fixing roller temperature T becomes lower than the lower limit value TSL, power is supplied to the fixing heater (ON). When the fixing roller temperature T exceeds the target temperature Ts and, further, the upper limit value TSU, the power supply is stopped (OFF).

Figure 10D:
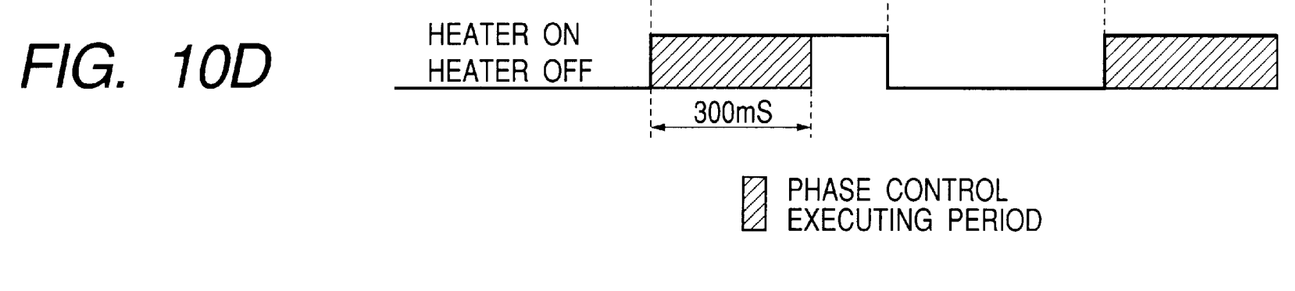

As shown in FIG. 10D, due to this arrangement, power is supplied (ON) when the fixing roller temperature T becomes lower than the lower limit value TSL, and, after the phase control for the period of 300 mS, no phase control is executed until the fixing roller temperature T becomes lower than the lower limit value TSL again. Thus, as compared with the prior art, the period during which phase control is executed is reduced, thereby reducing the period during which radio noise is generated.

Further, it goes without saying that the effect of present invention can be achieved by supplying a system or apparatus with a storage medium storing software program codes for realizing the function of the above-mentioned embodiment, and causing a computer (or a CPU or MPU) of the system or apparatus to read and execute the program codes stored in the storage medium.

The above-mentioned embodiments of the present invention should not be construed restrictively. All sorts of modification are possible without departing from the scope of the present invention.

What is claimed is:

1. A heating apparatus comprising:

a heat generating member;

a heating member heated by said heat generating member;

a temperature detecting member for detecting a temperature of said heating member; and power supply control means for controlling power supply to said heat generating member on the basis of a detection output of said temperature detecting member, said power supply control means including a first power supply control for applying an AC voltage of a limited phase to said heat generating member and a second power supply control for applying an AC voltage of an unlimited phase to said heat generating member, wherein turning ON/OFF of power supply to said heat generating member on the basis of the detection output of said temperature detecting member is not effected during the first power supply control.

2. A heating apparatus according to claim 1, wherein said power supply control means is switched to the second power supply control after the first power supply control is effected.

3. A heating apparatus according to claim 1, wherein, when the power supply to said heat generating member is started and the detection output of said temperature detecting member reaches a predetermined temperature level, said power supply control means executes the first power supply control.

4. A heating apparatus according to claim 1, wherein said power supply control means executes the first power supply control for a predetermined period of time, and wherein a power supply control interval based on the detection output of said temperature detecting member is larger than the predetermined period of time.

5. A heating apparatus according to claim 1, wherein said power supply control means controls the power supply such that the detection output of said temperature detecting member is maintained at a predetermined temperature.

6. A heating apparatus according to claim 5, wherein, when the detection output of said temperature detecting means is lower than a first temperature which is lower than the predetermined temperature, said power supply control means supplies power to the heat generating member, and when the detection output is higher than a second temperature which is higher than the predetermined temperature, said power supply control means stops power supply to the heat generating member.

7. A heating apparatus according to claim 1, wherein said heat generating member is a halogen heater.

8. A heating apparatus according to claim 1, further comprising phase angle setting means for setting a phase angle at the time of the first power supply control.

9. A heating apparatus according to claim 8, wherein said phase angle setting means sets the phase angle using a zero cross timing of an AC power source as a reference.

10. A heating apparatus according to claim 1, wherein heat is imparted to an unfixed image to fix the image through heating.

* * * * *

UNITED STATES PATENT AND TRADEMARK OFFICE
CERTIFICATE OF CORRECTION

PATENT NO. : 6,519,427 B2
DATED : February 11, 2003
INVENTOR(S) : Tatsuhito Kataoka It is certified that error appears in the above-identified patent and that said Letters Patent is hereby corrected as shown below:

<u>Title page,</u>
Item [57], ABSTRACT,
Line 2, "member" should read -- member, --.
Line 3, "member a" should read -- member, a --.

<u>Column 2,</u>
Line 51, "tn" should read -- an --.

<u>Column 9,</u>
Line 18, "an" should read -- a --.
Line 66, "changes" should read -- change --.

<u>Column 11,</u>
Line 13, "mS," should read -- ms, --.

Signed and Sealed this

Seventh Day of October, 2003

JAMES E. ROGAN
*Director of the United States Patent and Trademark Office*